US012743932B2

United States Patent

(12) Colston et al.

(10) Patent No.: US 12,743,932 B2
(45) Date of Patent: Sep. 22, 2026

(54) POCKET LOWER COVER FOR AN AUTOMATED TELLER MACHINE

(71) Applicant: Cardtronics USA, Inc., Atlanta, GA (US)

(72) Inventors: Scott Low Colston, Dundee (GB); Zelin Liu, Monifieth (GB); Jamie Kenneth Stewart, Dundee (GB); Callum Jacklin, Dundee (GB); Matthew Bowen, Perth (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/006,510

(22) Filed: Dec. 31, 2024

(65) Prior Publication Data

US 2026/0188083 A1 Jul. 2, 2026

(51) Int. Cl.

| | |
|---|---|
| ***G06K 19/00*** | (2006.01) |
| ***G07D 11/14*** | (2019.01) |
| ***G07D 11/40*** | (2019.01) |
| ***G07F 19/00*** | (2006.01) |

(52) U.S. Cl.

CPC ........... *G07F 19/202* (2013.01); *G07D 11/14* (2019.01); *G07D 11/40* (2019.01); *G07D 2211/00* (2013.01)

(58) Field of Classification Search

None

See application file for complete search history.

(56) References Cited

U.S. PATENT DOCUMENTS

| | | | | | |
|---|---|---|---|---|---|
| 5,172,643 | A * | 12/1992 | Koshida | G07F 19/20 | 109/66 |
| 5,454,332 | A * | 10/1995 | Fennelly | G07D 11/10 | 109/66 |
| 2015/0279144 | A1* | 10/2015 | Peters | G07D 11/40 | 194/344 |
| 2020/0126340 | A1 | 4/2020 | Tamahashi et al. | | |
| 2023/0058130 | A1 | 2/2023 | Dusterhus et al. | | |
| 2023/0169815 | A1 | 6/2023 | Murao | | |
| 2023/0368598 | A1* | 11/2023 | Yamada | B65H 1/025 | |

FOREIGN PATENT DOCUMENTS

| | | | | |
|---|---|---|---|---|
| KR | 20030058159 A | * | 7/2003 | G06Q 20/1085 |

* cited by examiner

*Primary Examiner* — Thien M Le
*Assistant Examiner* — April A Taylor
(74) *Attorney, Agent, or Firm* — Schwegman Lundberg & Woessner, P.A.

(57) ABSTRACT

A pocket lower cover for an automated teller machine (ATM) is described herein. The pocket lower cover can have a first surface configured to mount the pocket lower cover onto the ATM in a particular orientation with respect to a pocket of the ATM. The pocket lower cover can also have a second surface configured to connect the first surface to a staging plate of the ATM when the pocket lower cover is mounted to the ATM in the particular orientation. The lower pocket cover can also have a filler device configured to prevent paper media from fitting between the first surface and a shutter of the ATM.

20 Claims, 9 Drawing Sheets

POCKET LOWER COVER FOR AN AUTOMATED TELLER MACHINE

TECHNICAL FIELD

Embodiments described herein generally relate to automated teller machines and more specifically to a pocket lower cover for an automated teller machine.

BACKGROUND

An Automated Teller Machine (ATM) is an electronic device configured to provide service to users without the need for direct interaction with a person. In the context of banking services, an ATM is typically configured to dispense media (e.g., bank notes or specie), receive media (e.g., bank notes, specie, checks, etc.), or perform other transactions (e.g., transferring money between accounts, pay bills, etc.). An ATM includes both hardware and software components, enabling secure and efficient financial transactions. Usually. the hardware includes a card reader for identifying user accounts through magnetic stripe or chip-based debit or credit cards, a keypad or touchscreen for personal identification number (PIN) input and navigation, and a dispenser for media (e.g., bank notes). Other components can include a receipt printer, deposit slot, or a display screen for user interaction. The software within an ATM is usually embedded with encryption protocols and operates on secure communication networks to ensure data privacy and protection. ATMs are connected to networks (e.g., banking networks or central servers), enabling real-time account verification and transaction processing. ATMs operate using a combination of standardized protocols, such as ISO 8583, for transaction messaging and robust operating systems, often customized for security and reliability. ATMs enable customers to perform various banking tasks such as cash withdrawal, deposits, fund transfers, balance inquiries, or bill payments.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

ATM users depositing media (e.g., bank notes) may prepare the media before or during an interaction with the ATM. For example, a user may collect and stack notes together and place on a portion of the machine while the user waits for the ATM pocket, for example, accept the notes. Because the shutter moves relative to other pocket assembly components, such as the lower cover of the pocket, there is generally an opportunity for media placed on the pocket lower cover to slip between the lower pocket cover and the shutter. This can be unnoticed by the user, resulting in lost media, or even presentation of the media to a subsequent user based on shutter movements.

To address these issues, the lower pocket cover and be configured to include a filler device to, at least partially, fill a gap between the lower pocket cover and the shutter to prevent media from sliding between these two components. For example, one or more ribs can be used as a filler device or a flexible (e.g., foam) linear gasket. In case of ribs, the shutter can be configured to include receiving channels for the ribs that enables the ribs to extend into a general plane of the shutter while enabling the shutter to slide unimpeded in the direction of the ribs. In an example, the ribs include an angle or a radius to blend from a top of the rib to the lower pocket cover at one or both ends. In an example, a portion of the lower pocket cover can be angled such that media cannot be balanced on the lower pocket cover to discourage users from placing media in this location.

These features of the lower pocket cover can act to prevent or minimize users from inserting media between the shutter blade and the lower pocket cover. In some cases, the configuration of the lower pocket cover described herein can ensure that media fall into the correct position, under its own weight or when the shutter rises, within the acceptor for separation. Additional details and examples are provided below.

Figure 1:
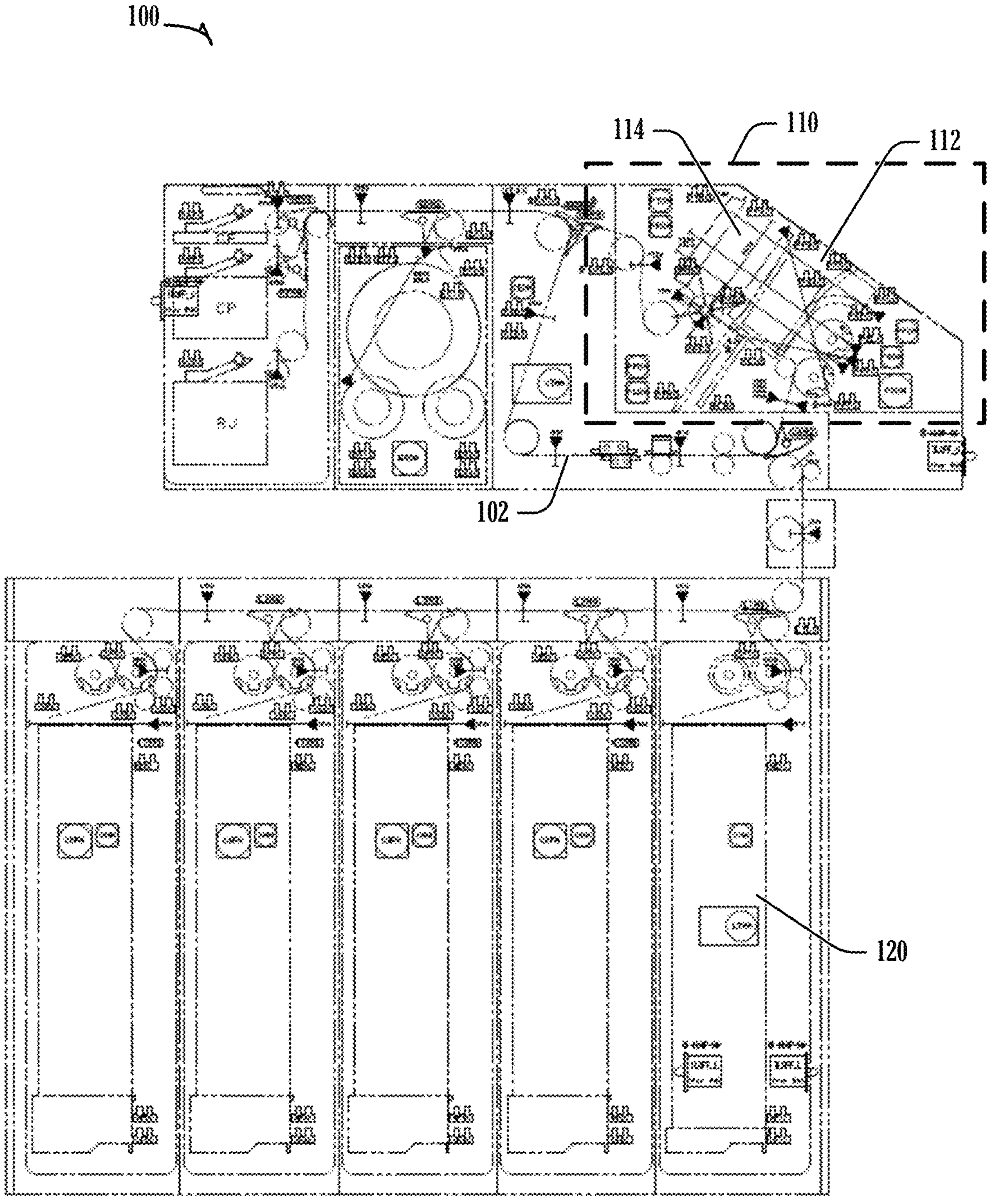
FIG. 1 illustrates an example of an ATM, according to an embodiment.

FIG. 1 illustrates an example of an ATM 100, according to an embodiment. The ATM 100 includes a pocket assembly 110. Here, the pocket assembly 110 is divided into a bottom compartment 112 and a top compartment 114. The pocket assembly 110 serves as the primary area for receiving and processing media (e.g., bank notes, receipts, etc.) within the ATM 100. The bottom compartment 112 and the top compartment 114 are configured to facilitate movement or storage of media during various stages of a transaction.

The ATM 100 can include one or more note storage compartments 120 (e.g., cassettes). A belt 102 or other transport mechanism can be coupled between various components in the pocket assembly 110 and the note storage compartments 120. The note storage compartments 120 are connected to the pocket assembly 110 and provide a secure location for storing media in the ATM 100 before, during, or after processing. The note storage compartments 120 can be configured to organize ATM media to, for example, be ready for future transactions or for collection. The connection between the pocket assembly 110 and the note storage compartment 120 enables efficient transfer or storage of media within the ATM 100.

Figure 2A:
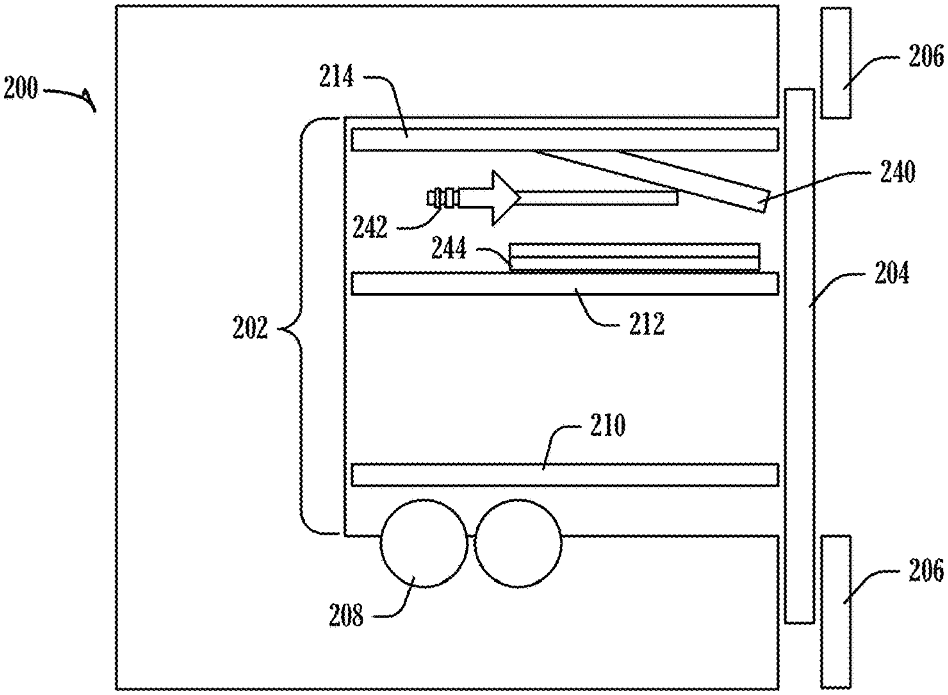
FIGS. 2A and 2B illustrate an example of a pocket assembly, according to an embodiment.
Figure 2B:
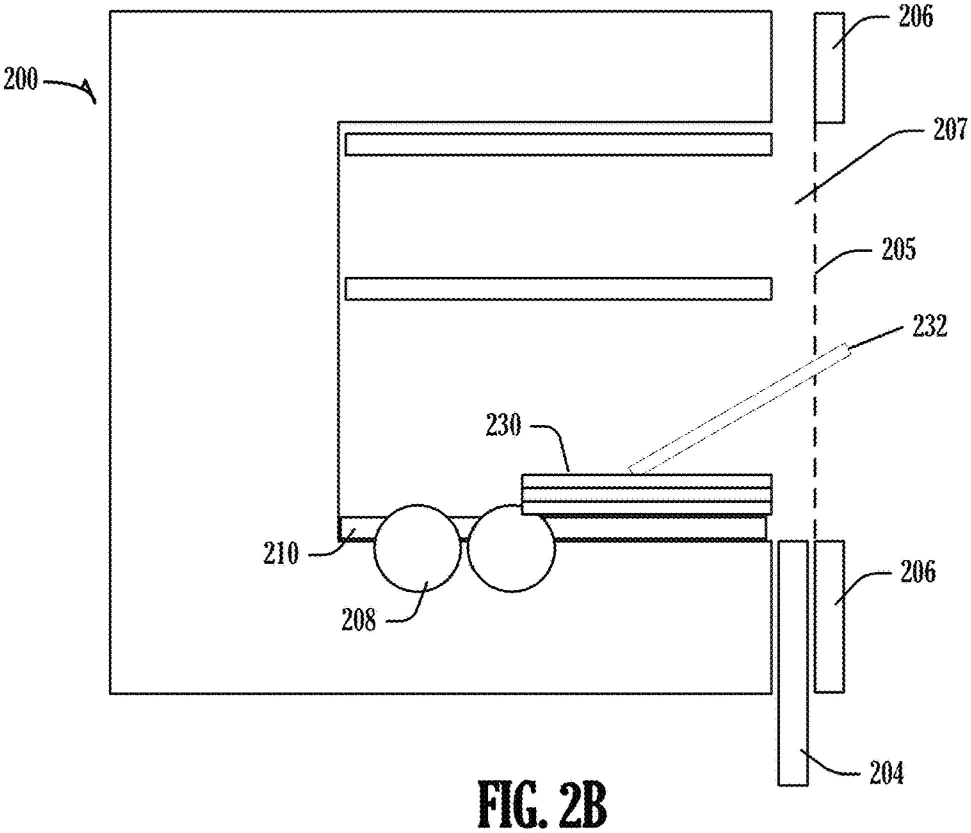

FIG. 2A and FIG. 2B illustrate an example of a pocket assembly 200 similar to the pocket assembly 110 illustrated in FIG. 1, according to an embodiment. As illustrated, the pocket assembly 200 includes a pocket 202, which serves as the primary area to receive media. The fascia 206 is located on an exterior surface of the ATM, surrounding the pocket 202 and providing an interface for users. The shutter 204 is movable to, as illustrated in FIG. 2A cover the pocket 202 when in a closed position or to reveal the pocket 202 to a user in an open position as illustrated in FIG. 2B. Within the pocket is a staging plate 210 and a pusher plate 212 that can move up and down to facilitate the handling of media.

In the position shown in FIG. 2A, the staging plate 210 and the pusher plate 212 define a bottom compartment, like the bottom compartment 112 from FIG. 1. In operation, a stack of media 230 is inserted onto the staging plate 210 and the staging plate is lowered as illustrated in FIG. 2B. One or more rollers 208 can protrude through the staging plate 210 in FIG. 2B and are used to transport individual pieces of the media 232 within the ATM. In an example, the pusher plate 212 is also lowered to apply pressure to the stack of media 230 (e.g., a stack of bank notes) while the rollers 208 engage the stack, although not shown in FIG. 2B.

The roof plate 214 is positioned above the pusher plate 212 in the pocket 202. In an example, the roof plate 214 (e.g., top plate) is also movable up and down within the pocket 202. In an example, the roof plate 214 does not move, but includes one or more movable portions 240, such as a deflector to deflect a moving piece of media 242 into a stack 244 in the top compartment, to, for example, dispense or return media to a user, when the shutter 204 is open.

A slot 207 is configured to guide the shutter 204 between the closed (e.g., extended) position illustrated in FIG. 2A and the open (e.g., retracted) position illustrated in FIG. 2B. An edge of the slot 207 is shown by dashed line 205, and the slot 207 is located between the pocket 202 and the fascia 206 of the ATM.

Figure 3:
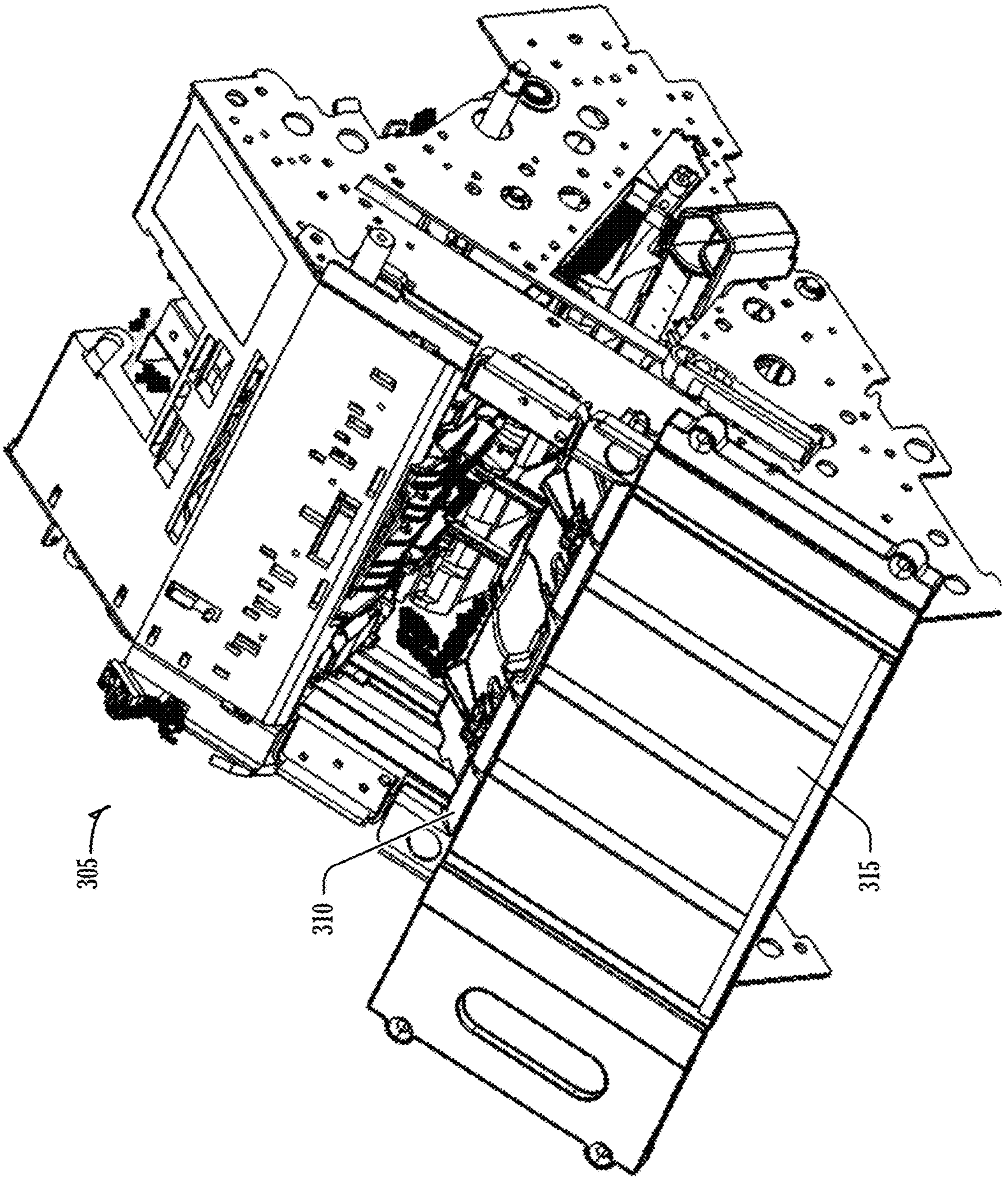
FIG. 3 illustrates a look into a pocket assembly including a lower pocket cover and a shutter, according to an embodiment.

FIG. 3 illustrates a look into a pocket assembly 305 including a lower pocket cover 310 and a shutter 315, according to an embodiment. When in operation, the shutter 315 (e.g., shutter blade) moves upwards to cover the pocket (e.g., acceptor area of the pocket) and prevent users from reaching into the pocket. The lower pocket cover 310 does not move during normal operation, but rather is configured to provide an enclosure to the lower portion of the pocket and the components therein.

Figure 4:
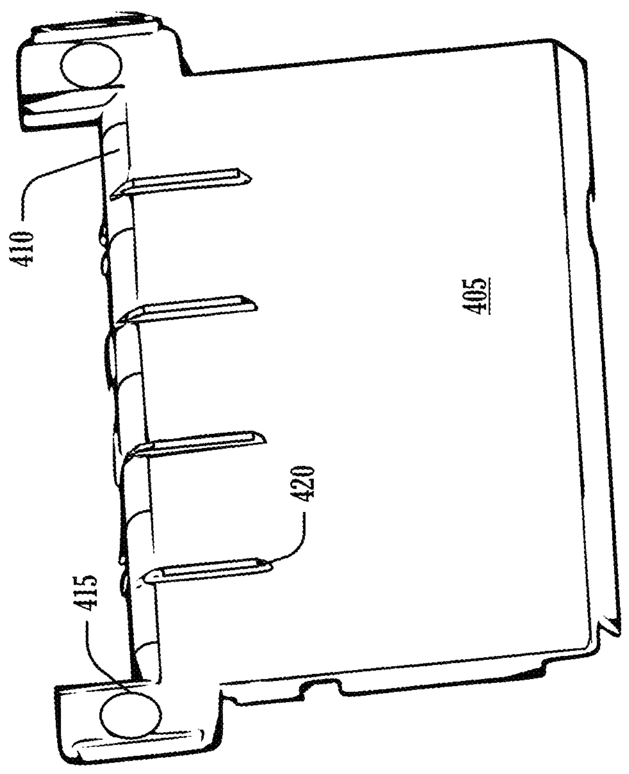
FIG. 4 illustrates an example of a lower pocket cover, according to an embodiment.

FIG. 4 illustrates an example of a lower pocket cover, according to an embodiment. The illustrated lower pocket cover includes a first surface 405 that is configured to mount the pocket lower cover onto on ATM in a particular orientation with respect to a pocket of the ATM (e.g., as illustrated in FIG. 3). This configuration can include, as illustrated, a tab and fastener passthrough 415 enabling, for example, the lower pocket cover to be screwed to another component of the pocket assembly.

The lower pocket cover includes a second surface 410 that is configured to connect the first surface to a staging plate of the pocket assembly when the pocket lower cover is mounted to the ATM in the particular orientation. In an example, the second surface 410 is connected to the first surface 405 by an interior angle that is greater than ninety degrees. Such an angle is likely to make a poor perch for paper media when the lower pocket cover is in use. Accordingly, placing the media on the second surface with such a relationship is likely to cause the media to fall to the ground than slip in between the lower pocket cover and the shutter. Accordingly, in an example, an angle of the second surface 410 with respect to gravity (e.g., when installed in the pocket assembly of an ATM during normal use) forms an incline configured to let media placed on the second surface fall free of the ATM.

In an example, the second surface 410 matches an angle of the staging plate with respect to the first surface when mounted to the ATM in the particular orientation. Here, the staging plate can include a ramp or other guide to help ensure that media inserted by the user is directed to an acceptor. The angle formed by the second surface 410 of the lower pocket cover here matches or otherwise integrates with the staging plate.

Figure 6:
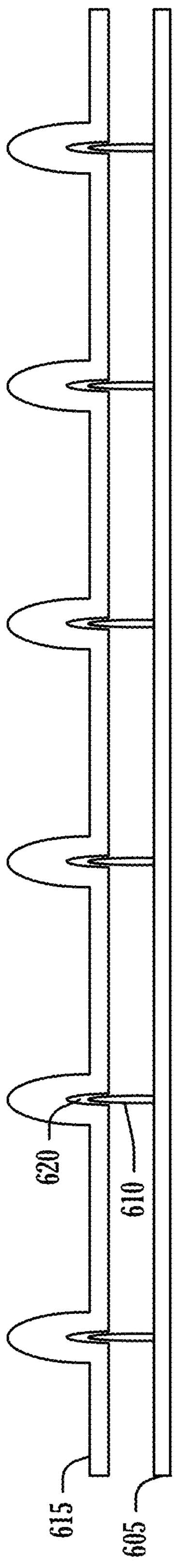
FIG. 6 illustrates an example interaction between a lower pocket cover and a shutter, according to an embodiment.

The lower pocket cover includes a filler device 420 that is configured to prevent paper media from fitting between the first surface 405 and a shutter of the pocket assembly, where the shutter is configured to move to block or enable access to the pocket by a user. In an example, the filler device 420 is a set of ribs on the first surface 405 oriented perpendicular to the first surface 405 and in a direction of travel for the shutter. This orientation is depicted in FIG. 6. In an example, the set of ribs are configured to fit into slots in the shutter (also depicted in FIG. 6).

In an example, ribs in the set of ribs are positioned on the first surface 405 with a distance between any two ribs less than a smallest media accepted by the ATM. This spacing ensures that any gaps between the ribs is too small to allow, under normal circumstances, a bank notes, for example, to slip between the gaps.

Figure 5:
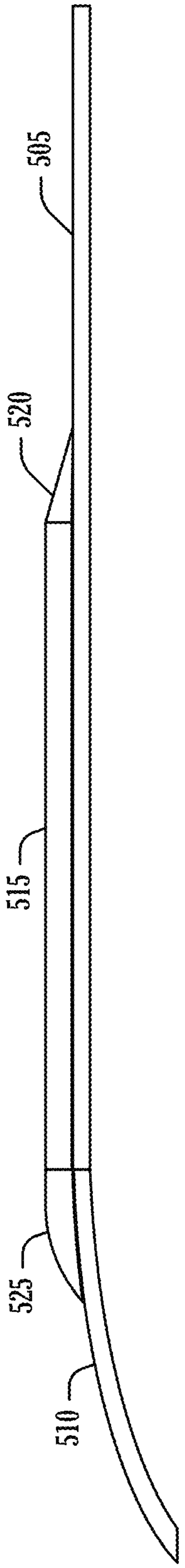
FIG. 5 illustrates an example of a profile of a lower pocket cover, according to an embodiment.

In an example, a rib from the set of ribs extends to the second surface 410. This is illustrated in as the end-portion of the rib 515 in FIG. 5. In an example, a rib in the set of ribs include an end portion that includes a linear or radial transition from a distal edge of the rib to the first surface 405 or the second surface 410. The end portion 525 of FIG. 5 illustrates an end portion of the rib 515 with a radial transition from the distal (e.g., top) side of the rib 515 to the surface 510, which is equivalent to the second surface 410. The end portion 520 illustrates an end portion 520 of the rib 515 with a linear transition to the surface 505, which is equivalent of the first surface 405.

FIG. 5 illustrates an example of a profile of a lower pocket cover, according to an embodiment. The surface 505 is equivalent to the first surface 405 and the surface 510 is equivalent to the second surface 410 from FIG. 4. The illustrated rib 515 extends upwards from the surface 505 and has two end portions. The end portion 525 carries the rib 515 onto the surface 510 and includes a rounded (e.g., radial) transition from the top (e.g., distal end) of the rib 515 to the surface 510. The end portion 520 includes a linear transition to the surface 505. In an example, one or both of the end portion 525 or the end portion 520 can be omitted (e.g., absent, missing, etc.) from the rib 515. In an example, both the end portion 525 and the end portion 520 have a linear transition. In an example, both the end portion 525 and the end portion 520 have a radial transition.

FIG. 6 illustrates an example interaction between a lower pocket cover 605 and a shutter 615, according to an embodiment. Here, the view is up or down along the path of travel of the shutter 615. In the illustrated example, the shutter includes channels, such as the channel 620 into which the ribs of the lower pocket cover 605, such as the rib 610, can occupy as the shutter moves. In the illustrated example, the largest space between any two ribs is smaller than a smallest edge of a smallest form of media accepted by the ATM.

Figure 7:
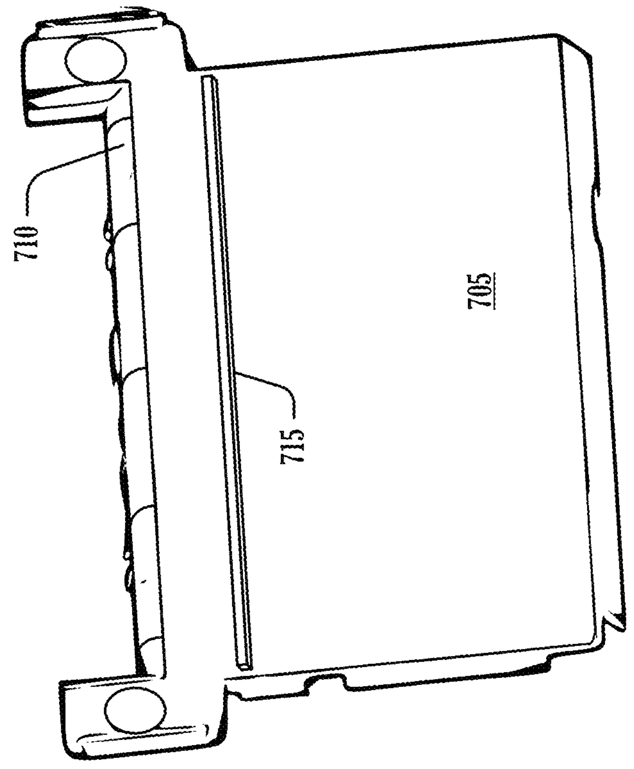
FIG. 7 illustrates an example of a lower pocket cover, according to an embodiment.

FIG. 7 illustrates an example of a lower pocket cover, according to an embodiment. The illustrated lower pocket cover includes a first surface 705 that is configured to mount the pocket lower cover onto on ATM in a particular orientation with respect to a pocket of the ATM (e.g., as illustrated in FIG. 3). This configuration can operate similar to that described above with respect to FIG. 4.

The lower pocket cover includes a second surface 710 that is configured to connect the first surface to a staging plate of the pocket assembly when the pocket lower cover is mounted to the ATM in the particular orientation. In an example, the second surface 710 is connected to the first surface 705 by an interior angle that is greater than ninety degrees. Such an angle is likely to make a poor perch for paper media when the lower pocket cover is in use. Accordingly, placing the media on the second surface with such a relationship is likely to cause the media to fall to the ground than slip in between the lower pocket cover and the shutter. Accordingly, in an example, an angle of the second surface 710 with respect to gravity (e.g., when installed in the pocket assembly of an ATM during normal use) forms an incline configured to let media placed on the second surface fall free of the ATM.

In an example, the second surface 710 matches an angle of the staging plate with respect to the first surface when mounted to the ATM in the particular orientation. Here, the staging plate can include a ramp or other guide to help ensure that media inserted by the user is directed to an acceptor. The angle formed by the second surface 710 of the lower pocket cover here matches or otherwise integrates with the staging plate.

The lower pocket cover includes a filler device 715 that is configured to prevent paper media from fitting between the first surface 705 and a shutter of the pocket assembly, where the shutter is configured to move to block or enable access to the pocket by a user. In an example, the filler device 715 is a linear gasket affixed to the first surface. In an example, the linear gasket is affixed with an adhesive. In an example, the linear gasket is formed from a foam to reduce pressure on the shutter.

Figure 8:
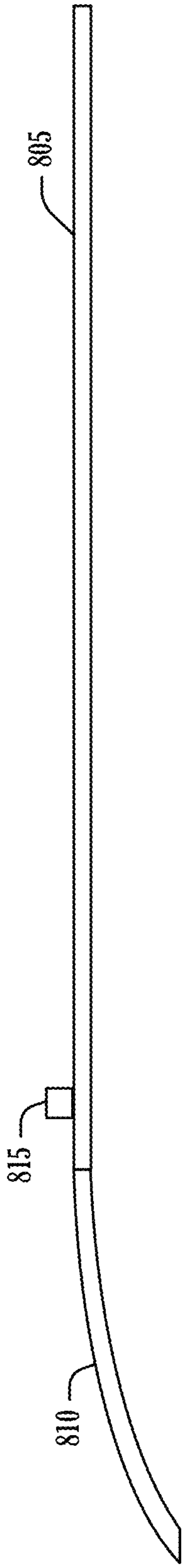
FIG. 8 illustrates an example of a profile of a lower pocket cover, according to an embodiment.

FIG. 8 illustrates an example of a profile of a lower pocket cover, according to an embodiment. The surface 805 is equivalent to the first surface 705 and the second surface 810 is equivalent to the surface 710 from FIG. 7. The illustrated linear gasket 815 extends upwards from the surface 805.

Figure 9:
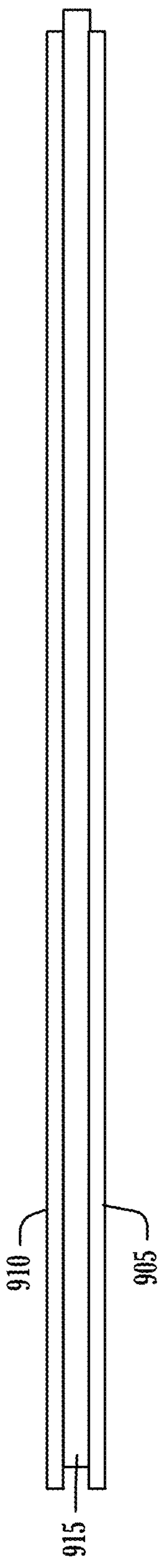
FIG. 9 illustrates an example interaction between a lower pocket cover and a shutter, according to an embodiment.

FIG. 9 illustrates an example interaction between a lower pocket cover 905 and a shutter 910, according to an embodiment. Here, the view is up or down along the path of travel of the shutter 910. In the illustrated example, the linear gasket 915 is configured to block space across the span of the shutter 910. As noted above, the linear gasket 915 can be constructed, in whole or part, of a compressible (e.g., foam) or flexible material to ensure that the gap is closed without providing too much pressure on the shutter 910.

ADDITIONAL NOTES & EXAMPLES

Example 1 is a pocket lower cover for an automated teller machine (ATM), the pocket lower cover including: a first surface configured to mount the pocket lower cover onto the ATM in a particular orientation with respect to a pocket of the ATM; a second surface configured to connect the first surface to a staging plate of the ATM when the pocket lower cover is mounted to the ATM in the particular orientation, the second surface connected to the first surface by an interior angle that is greater than ninety degrees; and a filler device configured to prevent paper media from fitting between the first surface and a shutter of the ATM configured to move to block or enable access to the pocket by a user.

In Example 2, the subject matter of Example 1, wherein the filler device is a linear gasket affixed to the first surface.

In Example 3, the subject matter of Example 2, wherein the linear gasket is affixed with an adhesive.

In Example 4, the subject matter of any of Examples 1-3, wherein the filler device is a set of ribs on the first surface oriented perpendicular to the first surface and in a direction of travel for the shutter.

In Example 5, the subject matter of Example 4, wherein the set of ribs are configured to fit into slots in the shutter.

In Example 6, the subject matter of any of Examples 4-5, wherein ribs in the set of ribs are positioned on the first surface with a distance between any two ribs less than a smallest media accepted by the ATM.

In Example 7, the subject matter of any of Examples 4-6, wherein a rib from the set of ribs extends to the second surface.

In Example 8, the subject matter of any of Examples 4-7, wherein a rib in the set of ribs include an end portion that includes a linear or radial transition from a distal edge of the rib to the first surface or the second surface.

In Example 9, the subject matter of any of Examples 1-8, wherein the second surface matches an angle of the staging plate with respect to the first surface when mounted to the ATM in the particular orientation.

In Example 10, the subject matter of any of Examples 1-9, wherein an angle of the second surface with respect to gravity forms an incline configured to let media placed on the second surface fall free of the ATM.

Example 11 is an automated teller machine (ATM) comprising: a pocket assembly to form a pocket; and a pocket lower cover including: a first surface configured to mount the pocket lower cover onto the ATM in a particular orientation with respect to the pocket assembly of the ATM; a second surface configured to connect the first surface to a staging plate of the ATM when the pocket lower cover is mounted to the ATM in the particular orientation, the second surface connected to the first surface by an interior angle that is greater than ninety degrees; and a filler device configured to prevent paper media from fitting between the first surface and a shutter of the ATM configured to move to block or enable access to the pocket by a user.

In Example 12, the subject matter of Example 11, wherein the filler device is a linear gasket affixed to the first surface.

In Example 13, the subject matter of Example 12, wherein the linear gasket is affixed with an adhesive.

In Example 14, the subject matter of any of Examples 11-13, wherein the filler device is a set of ribs on the first surface oriented perpendicular to the first surface and in a direction of travel for the shutter.

In Example 15, the subject matter of Example 14, wherein the set of ribs are configured to fit into slots in the shutter.

In Example 16, the subject matter of any of Examples 14-15, wherein ribs in the set of ribs are positioned on the first surface with a distance between any two ribs less than a smallest media accepted by the ATM.

In Example 17, the subject matter of any of Examples 14-16, wherein a rib from the set of ribs extends to the second surface.

In Example 18, the subject matter of any of Examples 14-17, wherein a rib in the set of ribs include an end portion that includes a linear or radial transition from a distal edge of the rib to the first surface or the second surface.

In Example 19, the subject matter of any of Examples 11-18, wherein the second surface matches an angle of the staging plate with respect to the first surface when mounted to the ATM in the particular orientation.

In Example 20, the subject matter of any of Examples 11-19, wherein an angle of the second surface with respect to gravity forms an incline configured to let media placed on the second surface fall free of the ATM.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A pocket lower cover for an automated teller machine (ATM), the pocket lower cover including:
- a first surface configured to mount the pocket lower cover onto the ATM in a particular orientation with respect to a pocket of the ATM;
- a second surface configured to connect the first surface to a staging plate of the ATM when the pocket lower cover is mounted to the ATM in the particular orientation, the second surface connected to the first surface by an interior angle that is greater than ninety degrees; and
- a filler device configured to prevent paper media from fitting between the first surface and a shutter of the ATM, wherein the shutter is configured to move to block or enable access to the pocket by a user.

2. The pocket lower cover of claim 1, wherein the filler device is a linear gasket affixed to the first surface.

3. The pocket lower cover of claim 2, wherein the linear gasket is affixed with an adhesive.

4. The pocket lower cover of claim 1, wherein the filler device is a set of ribs on the first surface oriented perpendicular to the first surface and in a direction of travel for the shutter.

5. The pocket lower cover of claim 4, wherein the set of ribs are configured to fit into slots in the shutter of the ATM.

6. The pocket lower cover of claim 4, wherein ribs in the set of ribs are positioned on the first surface with a distance between any two ribs less than a smallest media accepted by the ATM.

7. The pocket lower cover of claim 4, wherein a rib from the set of ribs extends to the second surface.

8. The pocket lower cover of claim 4, wherein a rib in the set of ribs include an end portion that includes a linear or radial transition from a distal edge of the rib to the first surface or the second surface.

9. The pocket lower cover of claim 1, wherein the second surface matches an angle of the staging plate of the ATM with respect to the first surface when mounted to the ATM in the particular orientation.

10. The pocket lower cover of claim 1, wherein an angle of the second surface with respect to gravity forms an incline configured to let media placed on the second surface fall free of the ATM.

11. An automated teller machine (ATM) comprising:
- a pocket assembly to form a pocket; and
- a pocket lower cover including:
- a first surface configured to mount the pocket lower cover onto the ATM in a particular orientation with respect to the pocket assembly of the ATM;
- a second surface configured to connect the first surface to a staging plate of the ATM when the pocket lower cover is mounted to the ATM in the particular orientation, the second surface connected to the first surface by an interior angle that is greater than ninety degrees; and
- a filler device configured to prevent paper media from fitting between the first surface and a shutter of the ATM, wherein the shutter is configured to move to block or enable access to the pocket by a user.

12. The ATM of claim 11, wherein the filler device is a linear gasket affixed to the first surface.

13. The ATM of claim 12, wherein the linear gasket is affixed with an adhesive.

14. The ATM of claim 11, wherein the filler device is a set of ribs on the first surface oriented perpendicular to the first surface and in a direction of travel for the shutter.

15. The ATM of claim 14, wherein the set of ribs are configured to fit into slots in the shutter.

16. The ATM of claim 14, wherein ribs in the set of ribs are positioned on the first surface with a distance between any two ribs less than a smallest media accepted by the ATM.

17. The ATM of claim 14, wherein a rib from the set of ribs extends to the second surface.

18. The ATM of claim 14, wherein a rib in the set of ribs include an end portion that includes a linear or radial transition from a distal edge of the rib to the first surface or the second surface.

19. The ATM of claim 11, wherein the second surface matches an angle of the staging plate with respect to the first surface when mounted to the ATM in the particular orientation.

20. The ATM of claim 11, wherein an angle of the second surface with respect to gravity forms an incline configured to let media placed on the second surface fall free of the ATM.

* * * * *